United States Patent [19]
Oleinick

[11] 3,736,671
[45] June 5, 1973

[54] EDUCATIONAL APPARATUS
[76] Inventor: Julius Oleinick, 121 Penhurst Drive, Pittsburgh, Pa. 15235
[22] Filed: June 24, 1971
[21] Appl. No.: 156,233

[52] U.S. Cl. ................................................. 35/9 C
[51] Int. Cl. ............................................. G09b 7/10
[58] Field of Search ..................... 35/9 B, 9 C, 48 R

[56] References Cited
UNITED STATES PATENTS

| | | | |
|---|---|---|---|
| 1,810,529 | 6/1931 | Rice | 35/9 C |
| 1,932,994 | 10/1933 | Tucker | 35/9 B |
| 2,965,975 | 12/1960 | Briggs | 35/9 B |
| 3,594,927 | 7/1971 | Koizumi | 35/48 R |

Primary Examiner—Wm. H. Grieb
Attorney—William D. Carothers, W. Douglas Carothers Jr. and Floyd B. Carothers

[57] ABSTRACT

Educational apparatus with a circuitry board provided to receive a program pannel having a problem or question section and response or answer section to permit the operator to first, through contact engaging means, select a question in the question section to be answered, and, secondly, seek proper selection of an answer through contact engaging means in the answer section, the correct response being indicated by signal means, such as, in the form of a light or bell. Selective switch means is provided in the circuitry board operative to indicate to the operator at any time desired the proper and correct response to the question selected through the signal means.

7 Claims, 4 Drawing Figures

INVENTOR.
JULIUS OLEINICK
BY CAROTHERS & CAROTHERS
HIS ATTORNEYS

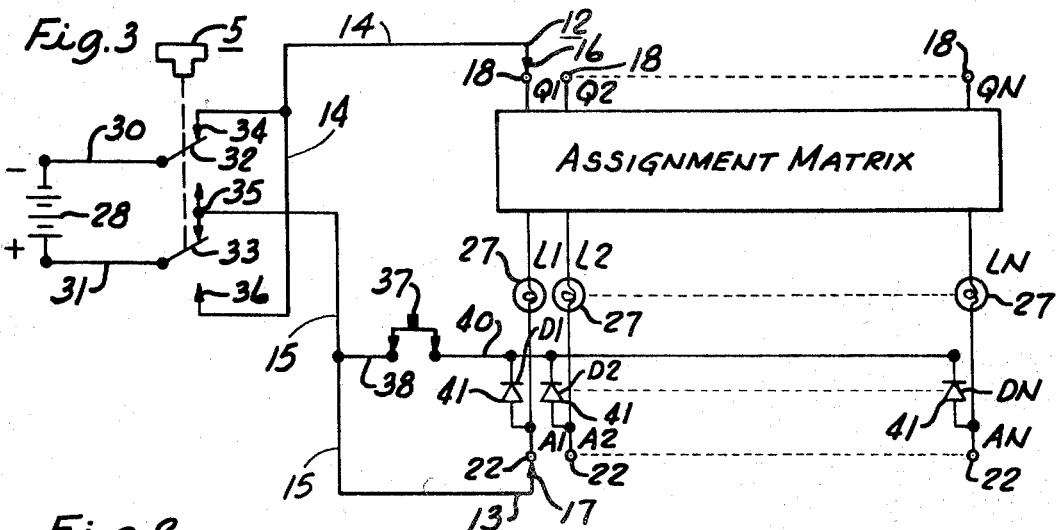
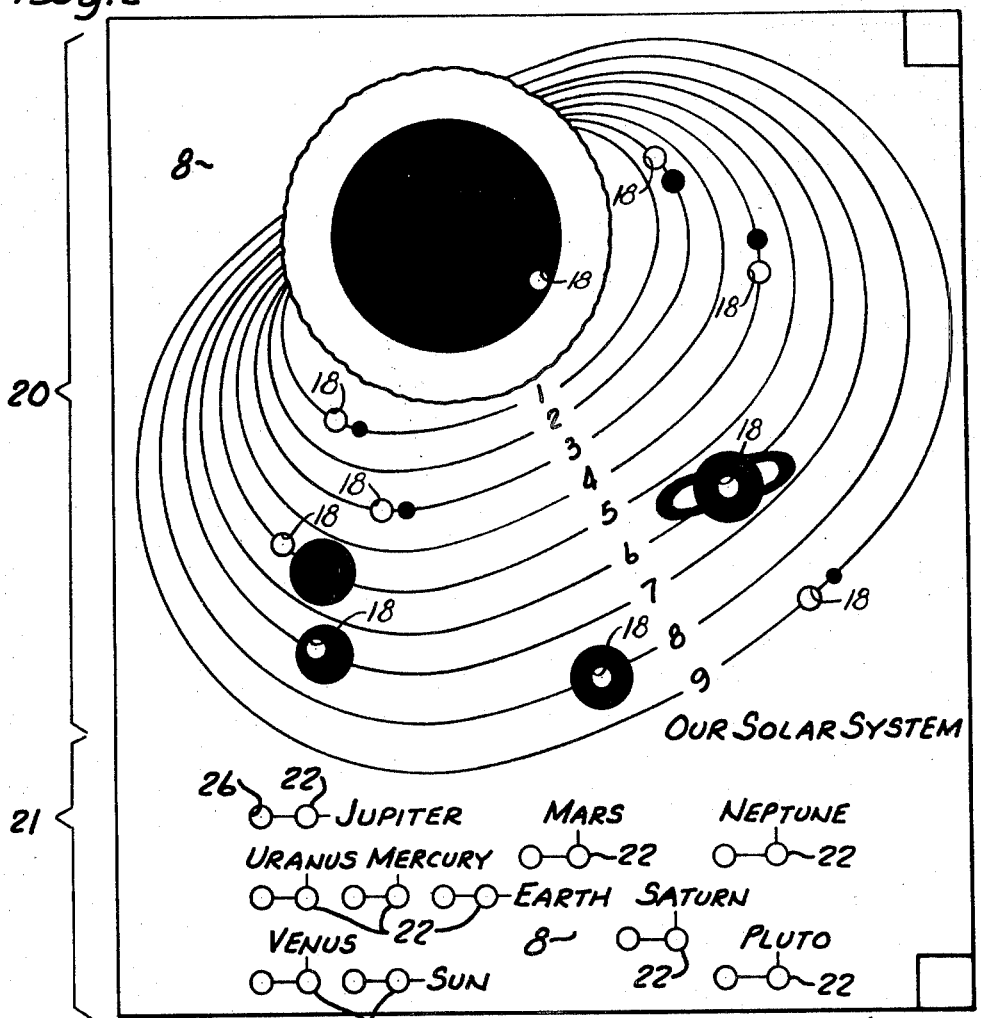

EDUCATIONAL APPARATUS

BACKGROUND OF INVENTION

The invention relates generally to educational apparatuses, that is, devices used by an individual to help and assist or teach the individual to learn and/or develop new skills or knowledge or to test or evaluate the individual as to his present level of skills and knowledge. The use of the term "educational" is intended to be used in its broadest sense to mean any type of testing and evaluation of individuals, skill development, learning or problem solution, such as, may relate to a multitude of different kinds of subject matter including geography, history, mathematics, engineering principles, identification of mechanical parts, or planets in the solar system, or associated symbols, etc. Although reference herein may be made to "questions" and "answer," or "question contacts" and "answer contacts," no literal limitation is intended to questions and answers in the generally accepted sense, such as, responses in the form of words or numbers. For example, symbol association for evaluation may be in the form of a question and answer series where the individual using the device is required to associate symbols into proper, similar symbol categories indicated in the "answer section" of the device. Such responses are similar to those employed in aptitude tests.

The educational device of the class herein disclosed is in an area of art where many such devices, in general, are quite numerous. However, many of the recent conceptions concerning educational devices have increasingly become quite complex in construction such as providing selection for multiple answers or means for multiple choice or providing electrical circuitry which will permit the individual or student using the educational device, hereinafter referred to as "operator," to not proceed further through a series of responses unless each selected response made consecutively in the series is correct.

Many institutions, such as, home, schools, hospitals, businesses, plants, retail outlets, etc. in our society today require a certain amount of intelligence, ability or knowledge before any type of relationship will be established by the institution, such as, the position of a student, child or employee. The use of educational devices presently conceived have either been unnecessarily sophisticated and, therefore, expensive for simplified uses such as in the home or in industry. Thus, there is need for relatively simple educational devices which are easily operated and provide means for a number of programs each representing a particular type of subject matter wherein the operator can readily select responses and receive, through the use of simple circuitry, an indication that either the response is correct or incorrect.

The educational apparatus of the type disclosed herein is in a class of such devices that are of such simplified nature which are provided with a frame in which circuitry is provided to provide for, in association with a problem board, the completion of an electrical circuit indicative of selecting a correct response through the use of contact engaging means generally consisting of a pair of electrical contact probes. Examples of such types of educational devices or apparatus are to be found in U. S. Pat. Nos.: 3,106,784; 3,314,166; 3,057,082; 2,198,894; 2,697,882; 2,627,672; and 3,126,649.

However, such devices have the disadvantage in not permitting the operator to be able to immediately obtain the correct response when, for example, he finds he is unable to make the choice through his own knowledge, information, or belief. This is an important feature in any education device of the class herein disclosed.

SUMMARY OF THE INVENTION

The principal feature of the present invention is the provision of an educational apparatus simple in structure and electrical circuit design yet capable of being used in a multitude of different situations where leaning is necessary, such as the improvement of the skills and knowledge of a child, student, machine operator, business manager, salesman, etc. In this connection, the apparatus herein disclosed provides the ability for the operator to obtain when desired the correct response to any problem, question, etc. proposed at any time, providing the operator with complete development of an interresponsive learning process as established between the use of the educational apparatus comprising this invention and the operator. Thus, the key to the apparatus is the fact that immediate obtainance of correct response is available to the student at any time he desires to make use of this availability.

Another provision of the present invention is the ability for the operator to develop a learning pattern or skills in any sequence as chosen by the operator since one necessarily never depends upon any specific or particular series of learning events. There is no particular programing sequence designed into the apparatus comprising this invention.

Another feature of the present invention is the ability to use the same educational apparatus and the electrical circuitry employed therein for any variety and programs designed from different fields of subject matter. The program panel on the top of the apparatus may be immediately substituted by another program panel having a different assignment of events to be learned and taught. For example, one panel can be designed for multiplication while another designed for a lesson in geography.

More specifically, the main object of this invention is the provision of an educational apparatus consisting of a circuitry board with a top panel section adapted to receive a program panel having a question section and an answer section. Questions, for example, are presented on the panel in the question section as represented by circuit contacts. The operator selects the corresponding circuit contact for the question he desires to answer. Contact engaging means is connected to that contact selected and corresponding to the question selected. The operator then selects what he believes to be the proper answer or response to the question selected by connecting another contact engaging means with a selected answer contact provided in the answer section of the panel. The program panel is so arranged with the design of the circuitry of the apparatus, that, if the answer selection is proper and correct, signal means, such as, a light or bell, will be activated indicating to the operator that a proper answer selection has been made. If the selection is not proper, the signal means will not be activated and the operator may proceed to make further answer contact selections in the answer section of the panel. The operator may do this several times, indicating that he is merely making random guesses as to the proper response, or until he finally becomes frustrated or determines he really does not know the correct response, at which point, he may operate selective switch means which will immediately indicate through the signal means the position of the correct response. Thus, as previously mentioned, the operator can obtain the correct response immediately or at any time he desires to avail himself of that opportunity.

Other objects and advantages appear hereinafter in the following description and claims.

The accompanying drawings show, for the purpose of exemplification without limiting the invention or the claims thereto, certain practical embodiments illustrating the principles of this invention wherein FIG. 1 is a plan view of the educational apparatus comprising this invention with a program panel.

FIG. 2 is another example of a program panel that can be used with the educational apparatus of FIG. 1.

FIG. 3 is a circuit diagram of the educational apparatus comprising this invention.

Figure 1:
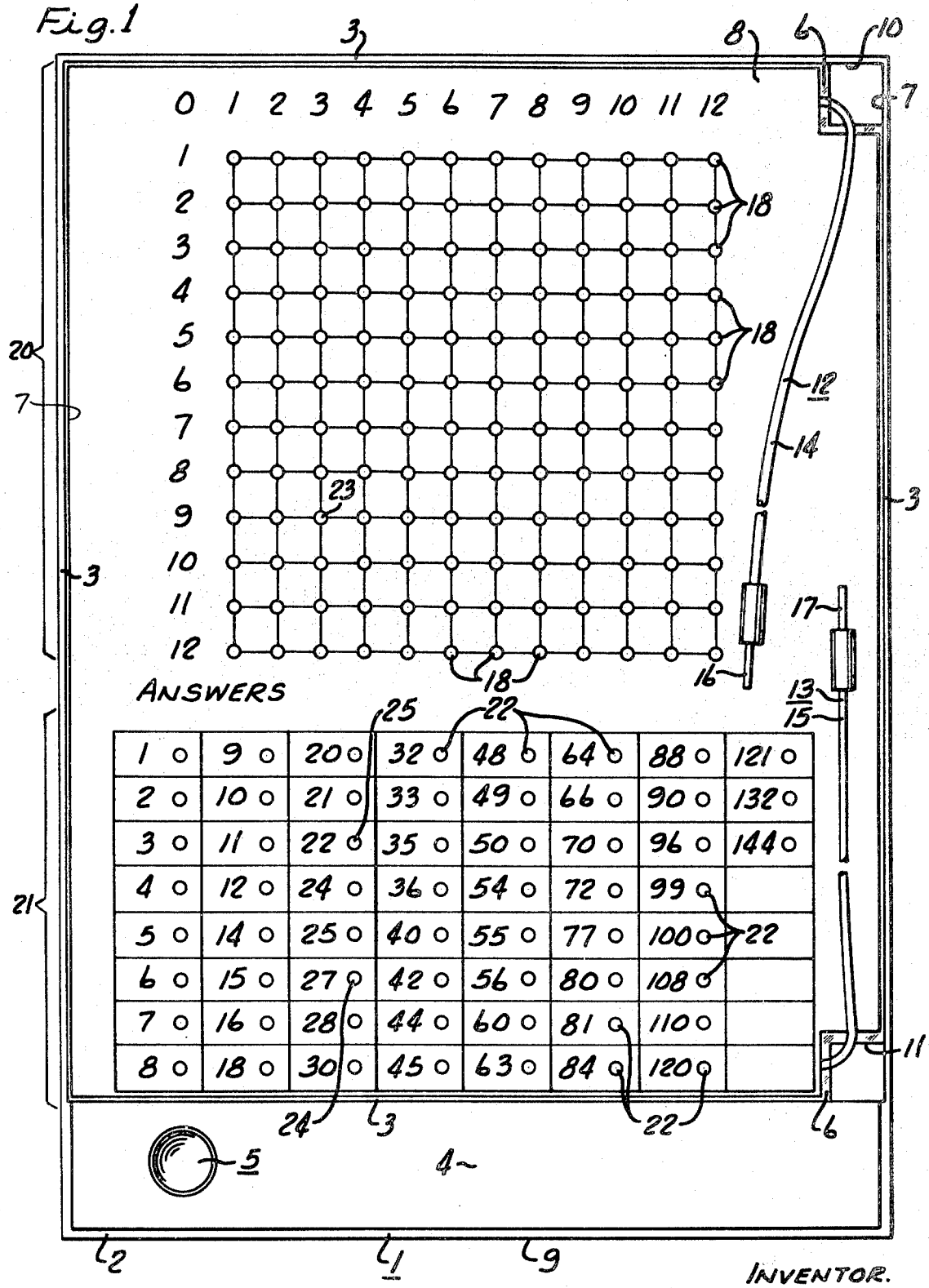

Referring now to FIG. 1, there is shown a plan view of the educational apparatus 1 comprising this invention and is provided with the frame 2 comprising the side walls 3 and end wall 9. One end of the frame 2 is provided with a name plate panel section 4 between one side wall 3 and end wall 9 to house the power supply, as will be evident from later discussion, and is also provided with selective switch means 5 which is an important feature comprising this invention and will be explained in further detail in connection with FIG. 3.

The side walls 3 support a base plate 6, which may be preferably transparent, or translucent, and the side walls 3 may extend a small distance above the base plate, such as, in the order of one sixteenth of an inch or so. This forms a rectangular cavity 7 to receive a program panel 8 as shown in FIG. 1. Also, in the areas where the base plate 6 is shown in FIG. 1 to protrude from under the program panel 8, there is an opening 10 and 11 provided to permit the connection of the contact engaging means 12 and 13 with the circuitry board as disclosed in FIG. 3. The contact engaging means 12 and 13 include the electrical conductors 14 and 15, respectively, the ends of which are provided with, in embodiment shown, the plugs, probe or jacks 16 and 17, respectively.

As can be seen upon viewing FIG. 1, the program panel 8 is provided with a series of apertures generally identified at 18, which apertures 18 are in alignment with openings (not shown) provided in the base plate 6 directly therebeneath. In the program panel 8 as shown in FIG. 1, the problem or question section is generally shown by the bracket identified at 20 whereas the response or answer section of the program panel 8 is generally indicated by the bracket 21. The question section 20 and the answer section 21 make up the entire area of the program panel 8. In the embodiment shown, the apertures 18 are in the area of the question section 20. However, the openings or apertures indicated at 22 are in the area of the answer section 21. As in the case of the openings or apertures 18, the apertures 22 are in alignment with corresponding holes therebeneath in the base plate 6. Thus, each of the program panels such as the panel 8 shown in FIG. 1 are provided with a series of apertures 18 in the question section 20 and a series of apertures 22 in the answer section 21, the arrangement of these apertures 18 and 22 are completely dependent on the program design on the program panel 8. However, these apertures 18 and 22 are always in alignment with corresponding openings already previously provided in the base plate 6 and thus, form apertures to receive the jacks 16 and 17. The apertures 18 in the question section 20 are to receive the jack 16 whereas the apertures 22 in the answer section 21 are to receive the jack plug 17. Apertures 18 and 22 will hereinafter be referred to also as electrical contacts 18 and 22 since each aperture is aligned with an electrical contact beneath the base plate 6 through which electrical contact is made by means of the contact engaging means 12 and 13.

As previously indicated, the program panel 8 is positioned over the base plate 6 as defined by the side walls 3 of the frame 2. The question section 20 is provided with a series of apertures 18 and numbers running vertically and horizontally from the upper left-hand corner in consecutive order up to and including the number "12." The jack 16 of the question probe 12, for example, is inserted into one of the selected apertures in the question section such as shown at 23. The aperture 23 in the question section 20 represents the multiplication factor of "three times nine." The operator then determines which of the appropriate answers in the response section 21 he should choose. After making the proper selection, the operator may insert jack of probe 17 of the answer contact engaging means 13 into the proper aperture. The correct response for the question designated at 23 in the particular situation here involved would be "27" as indicated at aperture 24. Upon insertion of the response probe 17 into the aperture 24, signal means will be responsive to indicate to the operator that the answer selected is correct. Signal means in this case may be in the form of a buzzer, bell, or light such as a light positioned directly under the translucent numeral "27" adjacent to aperture 24. By providing base plate 6 to be constructed of translucent or transparent material, the numerals, in the answer section 21 may be readily illuminated to indicate a correct response.

To explain further the operation and use of the educational apparatus, if the operator selects the incorrect response, such as, aperture 25 adjacent numeral "22," the signal means will not be responsive to the selection of the operator. The operator may then select other responses. If any of these responses are incorrect, he may use the selective switch means indicated at 5 which will indicate immediately the correct response being at aperture 24 by operation of the signal means as long as question probe 12 is still positioned in aperture 23 in the question section 20.

The foregoing explanation of the operation of the educational apparatus comprising this invention is given at this time in order to make clearly understood the operation of the educational apparatus prior to explanation of the circuitry for operating the educational apparatus, as will be explained hereafter in connection with FIG. 3.

FIG. 2 shows another program panel 8 designed for programs having different subject matter which may be readily used over the area of base plate 6 in the apparatus shown at FIG. 1. Again, the design of such programs is made through knowledge of the assignment metrics of the circuitry positioned beneath the base plate 6, and one may select the necessary position of the apertures 18 in the question section 20 as well as corresponding apertures 22 in the answer section 21 to provide for matching pairs of answers and questions, these pairs of apertures in the sections 20 and 21 are provided for in openings through the program panel 8 as shown in FIG. 2.

As can be seen in FIG. 2, the program panel 8 is generally opaque (except for the places where there are apertures) and is directed to the subject matter involving our solar system when there is provided a replica of the solar system in the question section 20 of the program panel 9. Each planet around the sun has an adjacent aperture contact 18, whereas the answer or response section 21 carries names and corresponding adjacent apertures 22 for responses to the questions in connection with the question section 20. Thus, the planets and the sun are identifiable by their size and shape. Thus, the operator upon inserting the question probe 12 into, for example, the aperture 18 shown in the circling ring identified as ring 5 will thereafter take the answer or response probe 13 and insert the same in the proper corresponding aperture 22 in the response section 21. If the operator inserts the response probe 13 into aperture 22 adjacent the name "Jupiter," the signal means in the form of the transparent or translucent aperture 26, beneath which is a lamp 27 shown in FIG. 3, will be illuminated indicating that the proper response has been made. If the response of the operator is incorrect, then the operator may choose to use the selective switch means shown at 5 in FIG. 1 in order to illuminate the lamp 27 through the opening 26 provided adjacent to the word "Jupiter."

Having explained the function of the educational apparatus 1 together with two different examples of the program panel 8, reference is now made to the circuitry for operating the education apparatus 1 shown in FIG. 3.

The circuitry for the educational apparatus 1 involves the power supply in the form of the direct current source 28 which is connected by leads 30 and 31 to the selective switch means 5 which is shown to be in the form of a double pole, double throw switch consisting of contact poles 32 and 33 and contact points 34, 35 and 36. Contact point 34 is connected by lead 14 of contact engaging means 12 to contact point 36 as well as to jack 16. By the same token, central contact point 35 is connected by lead 15 of the response contact engaging means 13 to jack 17.

It will now be noted that in connection with FIGS. 3, the question probe or jack 16 is shown connected to or in engagement with one of the selective apertures 18 in the question section 20 of the program panel 8 whereas the answer probe or jack 17 is connected or in engagement with one of the apertures 22 provided in answer section 21 of the program panel 8. Each of the apertures 18 is represented in FIG. 3 by the contact designations or modes Q1, Q2, etc. up to the total number of contacts QN. Each of these question modes Q1 through QN is connected through assignment matrix to a corresponding signal means shown here in the form of the lamps 27 which are also consecutively designated as L1, L2, etc. up to and including the last lamp in the circuit designated as LN. By the same token, each of the answer apertures or contacts 22 are provided to be connected respectively to one of the lamps L1 through LN as indicated in FIG. 3 and are designated as modes A1, A2, etc. up to and including the last answer aperture or contact 22 designated as AN. Thus, it can be seen, depending upon the assignment matrix if question mode Q1 corresponds to answer mode A1, upon insertion of the question probe 12 and answer probe 13 as shown in FIG. 3, lamp L1 will be immediately illuminated.

It will also be noted that lead 15 is connected through insert switch 37 by means of line 38. The other side of insert switch 37 is connected by line 40 to the cathodes of each of the diodes 41 whereas the anodes of each of the diodes 41 is respectively connected between a lamp 27 and an answer contact 22. Thus, diode 41 designated as D1 is connected between lamp L1 and response contact mode A1.

Insert switch 37 is merely an optional feature and not necessary in connection with the operation of the circuit of FIG. 3. Insert switch 37 merely performs the function of making inoperative the use of the selected switch means 5 if it is desired not to permit the operator to readily obtain and determine the proper response to any question selected. Thus, with insert switch 37 inserted as shown in FIG. 3, explanation will now be made out of the operation of the selected switch means 5.

If, for example, the question probe 16 has been placed in engagement with the contact 18 designated as mode Q1, and the response selected by the operator through answer probe 17 is the contact 22 designated as mode A2, which is an incorrect response, neither the lamp designated L1 or L2 will be illuminated. At this point, the operator may push selective switch means 5 (which is shown in its normal operating position) so that contact poles 32 and 33 will respectively engage contact points 35 and 36. It can be seen that the polarity of dc power source 28 is reversed so that line 14 is made positive whereas line 15 is made negative. As a result, diode designated D1 will become operative since question probe 12 is already inserted in mode Q1. Thus, lamp L1 will immediately illuminate since diode D1 will become operational permitting the passage of current indicating that the corresponding response contact designated as mode A1 is the correct response for which the operator should have selected.

Figure 4:
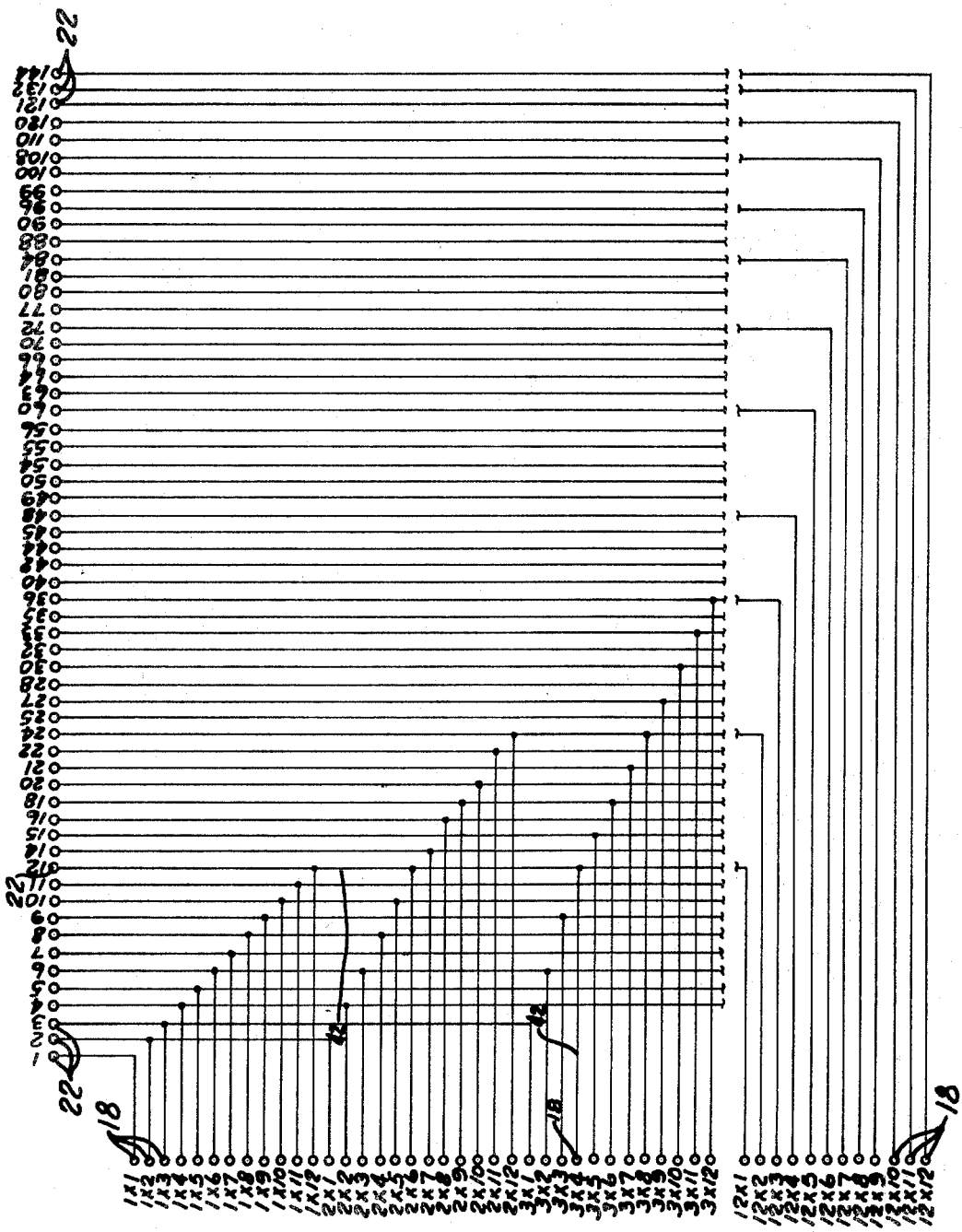
FIG. 4 is a circuit diagram of the assignment matrix shown in FIG. 3.

Reference is now made to FIG. 4 wherein there is shown the detail of assignment matrix which may be used in connection with the circuit shown in FIG. 3. The assignment matrix shown in FIG. 4 is designated particularly for use in connection with the program panel 8 as shown in FIG. 1 involving multiplication. However, this particular matrix pattern may be used for any program design desired. The assignment matrix is only shown partially since it is quite repetitious and is therefore unnecessary to show the entire assignment matrix circuitry. The assignment matrix for the multiplication table is chosen particularly since it provides a circuitry matrix that may be used with numerous possible types of programs that may be designed to be used in connection with the education apparatus 1. One of the principal reasons for this is the fact that it is well known that certain multiplication factors, such as, "3×4" and "2×6" and "1×12" must provide the same response in the question section 21, to wit, the contact 22 corresponding to the numeral "12" in FIG. 4. Thus, in designing other programs and other areas of subject that may be used in connection with the assignment matrix as shown in FIG. 4, it is always possible to provide questions which have more than one answer since the assignment matrix of FIG. 4 provides for this capability. For example, in the example just given, it can be seen at line 42 in connection with contact 18 for the question "3×4" that the response is "12" and that the same is true in connection with the questions "1×12 and "2×6," the contacts 18 of which are connected directly to line 42 to give the resultant and proper response at contact 22 designated by the numeral "12."

From all the foregoing, it can be readily seen that the educational apparatus comprising this invention is quite simple in structure and circuitry while at the same time providing the capability of being versatile in permitting the use of numerous types of programs involving any multitude of subject matter for use in connection with the program panel 8 as previously discussed. It should be noted that instead of using the diodes 41 indicated in FIG. 3, any semiconductive switching means may be utilized together with accompanying necessary circuitry for its operation to be responsive to the operation of the selective switch means 5. Such switching means are well known in the art, two of which would be the field effect transistor wherein the biasing on the base of the transistor could be changed to operate selective of the lamps L1. By the same token the silicon controlled rectifier could be utilized as a switching means to be operative upon response to a trigger circuit used in connection with the selective switch means.

I claim:

1. An educational apparatus comprising a base, an assignment circuit matrix included in said base, a plurality of spaced question contacts arranged in one portion of said base and a plurality of spaced answer contacts arranged in another area of said base, signal means individually connected to each of said question contacts to the other side of said circuit matrix, a pair of contact engaging means for connection to one of said question and answer contacts, respectively, wherein said signal means is activated when said engaging means are connected to proper question and answer contacts, selective switch means connecting said contact engaging means to direct current power source, a diode connected between each signal means and said answer contact with their other end connected to said selective switch means, said selective switch means operative to reverse the polarity of said power source to operate selective of said signal means dependent upon connection of one of said contact engaging means in one of said question contacts.

2. The educational apparatus of claim 1 characterized by means provided within the top of said base to receive a question and answer card having prearranged openings corresponding to at least a portion of said question and answer contacts.

3. The educational apparatus of claim 1 characterized in that said signal means are electrical lamps.

4. The educational apparatus of claim 1 characterized by additional switch means connected between said diodes and said selective switch means operative to render the latter inoperative.

5. The educational apparatus of claim 1 characterized in that said selective switch means is a double pole - double throw switch.

6. An educational apparatus comprising a base, an assignment circuit matrix included in said base, a plurality of spaced question contacts arranged in one portion of said base and a plurality of spaced answer contacts arranged in another area of said base, said question contacts individually connected to one side of said circuit matrix, signal means individually connected to each of said answer contacts to the other side of said circuit matrix, a pair of contact engaging means for connection to one of said question and answer contacts, respectively, selective switch means connecting said contact engaging means to a power source, said signal means activated upon connection of said contact engaging means with proper question and answer contacts, switching circuit means connected between said signal means and said answer contacts responsive on operation of said selective switch means to operate selective of said signal means to indicate the proper circuit response dependent upon connection of one of said contact engaging means in one of said question contacts.

7. In combination, with the educational apparatus of claim 6, a program panel arranged to fit over said base, a plurality of apertures in said panel for alignment with corresponding question contacts and answer contacts in said base, the position of said apertures in said panel selected in accordance to the question and answer program on said panel and in circuit symmetry with said assignment circuit matrix.

* * * * *

UNITED STATES PATENT OFFICE
CERTIFICATE OF CORRECTION

Patent No. 3,736,671          Dated June 5, 1973

Inventor(s) Julius Oleinick

It is certified that error appears in the above-identified patent and that said Letters Patent are hereby corrected as shown below:

Col. 7, line 32, after "and" insert --individually connected to one side of said circuit matrix,-- line 34, erase "question" and substitute --answer-- line 35, after "contacts" insert --and--

Col. 8, line 24, after "contacts" insert --and-- line 32, after "contacts" insert --to said selective switch means and--

Signed and sealed this 22nd day of January 1974.

(SEAL)
Attest:

EDWARD M. FLETCHER, JR.      RENE D. TEGTMEYER
Attesting Officer              Acting Commissioner of Patents